(12) United States Patent
Jung et al.

(10) Patent No.: US 11,018,760 B1
(45) Date of Patent: May 25, 2021

(54) METHOD AND APPARATUS FOR AUTOMATIC PROVISIONING OF OPTICAL MODULE

(71) Applicant: HFR Networks, Richardson, TX (US)

(72) Inventors: Changhwan Jung, Lewisville, TX (US); Kwanho Kim, Frisco, TX (US); Justin Peterson, Chesterfield, MO (US)

(73) Assignee: HFR Networks, Richardson, TX (US)

( * ) Notice: Subject to any disclaimer, the term of this patent is extended or adjusted under 35 U.S.C. 154(b) by 0 days.

(21) Appl. No.: 17/016,319

(22) Filed: Sep. 9, 2020

(51) Int. Cl.
  *H04B 10/03* (2013.01)
  *H04B 10/27* (2013.01)
  *H04B 10/077* (2013.01)
  *H04J 14/02* (2006.01)

(52) U.S. Cl.
  CPC ......... *H04B 10/03* (2013.01); *H04B 10/0771* (2013.01); *H04B 10/27* (2013.01); *H04J 14/021* (2013.01)

(58) Field of Classification Search
  CPC .... H04B 10/03; H04B 10/0771; H04B 10/27; H04J 14/021
  USPC .............................................................. 398/7
  See application file for complete search history.

(56) References Cited

U.S. PATENT DOCUMENTS

| | | | | |
|---|---|---|---|---|
| 10,135,558 | B2 * | 11/2018 | Nomura | H04B 10/572 |
| 10,148,382 | B1 * | 12/2018 | Olson | H04J 14/0282 |
| 2010/0239263 | A1 * | 9/2010 | Tokura | H04J 14/0279 |
| | | | | 398/94 |
| 2018/0062746 | A1 * | 3/2018 | Ohteru | H04L 12/44 |
| 2019/0052392 | A1 * | 2/2019 | DeAndrea | H04J 14/0228 |

* cited by examiner

*Primary Examiner* — Dalzid E Singh
(74) *Attorney, Agent, or Firm* — Harness, Dickey & Pierce, P.L.C.

(57) ABSTRACT

A method and apparatus are provided for tuning a wavelength of an optical signal outputted by first optical module installed on central office terminal (COT) equipment on a central office side and a wavelength of an optical signal outputted by second optical module installed on a remote office side in an optical communication system, which perform port deactivation by blocking a signal input/output at a front-end port corresponding to a rear-end port installed with the first optical module.

14 Claims, 5 Drawing Sheets

METHOD AND APPARATUS FOR AUTOMATIC PROVISIONING OF OPTICAL MODULE

TECHNICAL FIELD

The present disclosure in some embodiments relates to a method and apparatus for automatic provisioning of optical module.

BACKGROUND

The statements in this section merely provide background information related to the present disclosure and do not necessarily constitute prior art.

Wired/wireless communication services are progressing into multimedia communication services that transmit circuit data, packet data, etc., as well as voice data. Such data demand continues to rise rapidly, and the amount of data traffic is expected to increase further. As one of the methods for smoothly processing the increasing data traffic, a wavelength division multiplexing (hereinafter referred to as 'WDM') method has been developed.

Applicable to a transmission backbone network that is a core infrastructure of a high-speed information and communication network, the WDM method arranges channels carrying respective signals at regular wavelength intervals and optically multiplex the signals to transmit a large amount of information through a single strand of optical fiber.

A dense WDM (hereinafter referred to as 'DWDM') method, which is a high-density version of the conventional WDM method, further subdivides the spacing between wavelengths for use to greatly increase the total traffic per optical fiber. The DWDM method generally uses about 80 optical wavelengths.

In the optical communication systems using the WDM method and the DWDM method, an optical communication switch or an optical module is used for connecting an electrical signal to an input/output optical signal.

An optical module refers to an optical connector that incorporates a light source device, a light source detection device, an optical transmitter circuit, an optical receiver circuit, and the like. The optical module is manufactured according to various technical standards, for example, one of the standard form factors such as a small form-factor pluggable module (SFP module), an enhanced small form-factor pluggable module (SFP+ module), and a small form-factor pluggable 28 module (SFP28 module).

Current optical communication systems mainly use a fixed optical module or fixed optical transceiver that is pre-allocated with the wavelength of the optical signal generated by the light source. Therefore, with the WDM method in which one wavelength is allocated to each channel, a different fixed optical transceiver needs to be used for each channel.

Communication service providers are required to have spare optical modules in preparation for the failure of the optical module. However, with the introduction of the DWDM method involving a large number of channels, the communication service providers are troubled with inventory management due to dozens more of different types of fixed optical transceivers for them to use. Moreover, when installing or replacing a fixed optical transceiver, there is an issue to dispatch a field technician who is capable of identifying a channel to be used and determining a fixed optical transceiver suitable therefor.

To solve the above-described issue, a self-tuning optical transceiver has been developed that can automatically set the wavelength of an optical signal according to a channel. As one of wavelength tuning technologies for a self-tuning optical module, there is a remote wavelength tuning technology that a central office terminal (COT) equipment uses an initially set wavelength as a basis for automatically tuning or setting the wavelength of an optical signal outputted by an optical module located at a remote location. Manually setting the wavelength of the optical signal outputted from an optical module installed in the COT equipment will automatically set the wavelength of the optical signal outputted by the optical module located at a remote location. Therefore, there is an advantage that the field technician does not need to go to the remote site in person.

On the other hand, there is an increasing demand for an optical module that can automatically set the wavelength of the optical signal outputted from the optical module installed on the COT equipment without the need to manually set the wavelength to reduce network management personnel and costs. Accordingly, an automatic wavelength tuning technology has been developed in which optical modules installed on the central office and remote office sides can autonomously search for the available wavelengths for service. The optical module searches for a wavelength until an available wavelength is found based on a preset wavelength band and spacing. However, this technology has deficiencies that it cannot work seamlessly with all types of central office equipment and has a lower success rate of wavelength tuning of the optical module installed on the remote office when compared to the remote wavelength tuning technology.

SUMMARY

According to at least one aspect, the present disclosure provides a method of tuning a wavelength of an optical signal outputted by a first optical module installed on central office terminal (COT) equipment on a central office side and a wavelength of an optical signal outputted by a second optical module installed on a remote office side in an optical communication system, including performing a port deactivation process for blocking a signal input/output at a front-end port corresponding to a rear-end port on which the first optical module is installed, and performing a first control process for controlling the first optical module and the second optical module to perform a wavelength scan by activating an automatic wavelength tuning function of the first optical module, and determining whether a tuning is made on the wavelength of the optical signal outputted by the first optical module as a result of performing the wavelength scan, and performing a second control process for deactivating the automatic wavelength tuning function of the first optical module upon determining that the tuning is made on the wavelength of the optical signal outputted by the first optical module, and performing a port activation process for releasing the blocking of the signal input/output at the front-end port.

According to another aspect, the present disclosure provides a wavelength tuning apparatus for tuning a wavelength of an optical signal outputted by a first optical module installed on central office terminal (COT) equipment on a central office side and a wavelength of an optical signal outputted by a second optical module installed on a remote office side in an optical communication system, including a port deactivation unit, an automatic tuning activation unit, a wavelength tuning determination unit, an automatic tuning deactivation unit, and a port activation unit. The port deactivation unit is configured to block a signal input/output at a front-end port corresponding to a rear-end port on which the first optical module is installed. The automatic tuning activation unit is configured to control the first optical module and the second optical module to perform a wavelength scan by activating an automatic wavelength tuning function of the first optical module. The wavelength tuning determination unit is configured to determine whether tuning is made on the wavelength of the optical signal outputted by the first optical module as a result of performing the wavelength scan. The automatic tuning deactivation unit configured to deactivate the automatic wavelength tuning function of the first optical module upon determining that the tuning is made on the wavelength of the optical signal outputted by the first optical module. The port activation unit is configured to release the blocking of the signal input/output at the front-end port.

Figure 1:
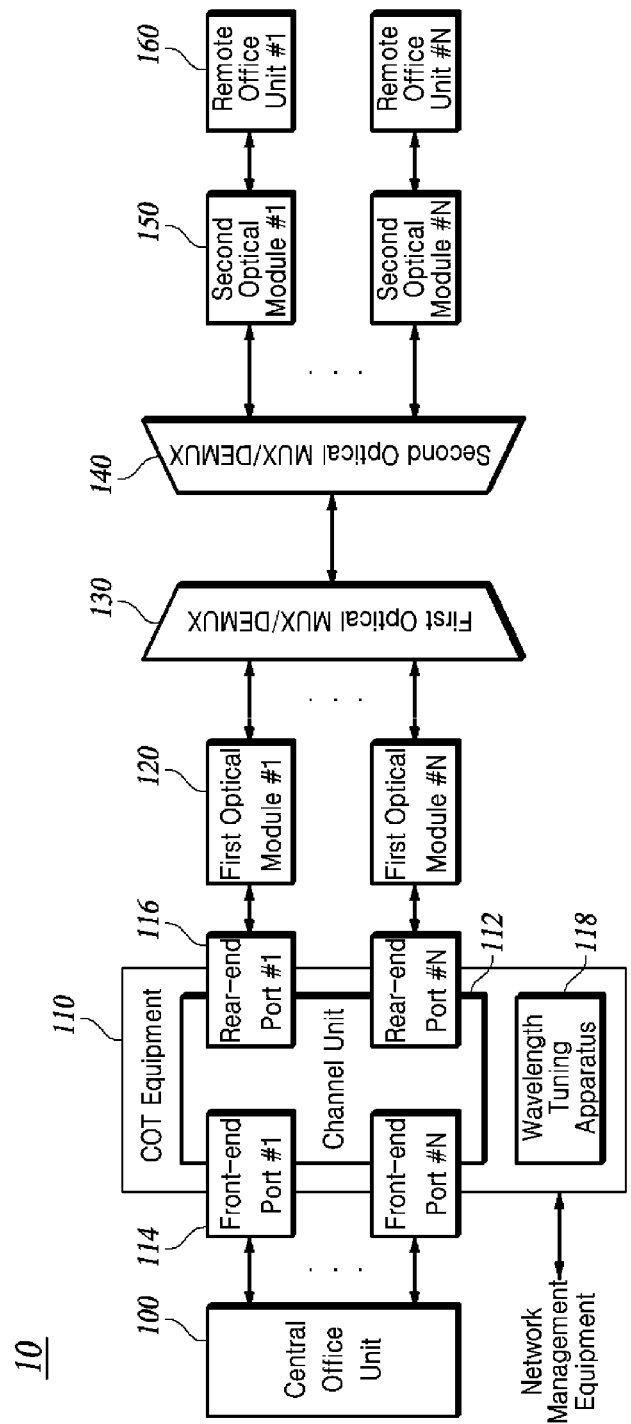
FIG. 1 is a schematic block diagram of a wavelength tuning system according to a first embodiment of the present disclosure.

| REFERENCE NUMERALS | |
|---|---|
| 10: wavelength tuning system | 100: central office unit |
| 110: COT (central office terminal) equipment | |
| 112: channel unit | 114: front-end port |
| 116: rear-end port | 118: wavelength tuning apparatus |
| 120: first optical module | |
| 130: first optical MUX/DEMUX | |
| 140: second optical MUX/DEMUX | |
| 150: second optical module | 160: remote office unit |
| 200: port deactivation unit | 202: automatic tuning activation unit |
| 204: wavelength tuning determination unit | |
| 206: automatic tuning deactivation unit | |
| 208: port activation unit | 210: remote tuning control unit |
| 212: wavelength information collection unit | |
| 214: notification generation unit | 216: port detection unit |
| 218: communication detection unit | 220: wavelength retuning unit |
| 222: communication unit | |

DETAILED DESCRIPTION

The present disclosure in some embodiments seeks to provide a method and apparatus using an auto-tuning optical module for automatically tuning the wavelength of an optical signal by blocking an external interference from central office unit and by performing a double-action operation of tuning the wavelength of the optical module installed in a remote office unit to increase the success rate of the wavelength tuning.

Further, present disclosure in some embodiments seeks to provide a method and apparatus for automatically tuning the wavelength of an optical signal in an optical communications system, which can reduce network management personnel and costs.

Exemplary embodiments of the present disclosure are described below with reference to the accompanying drawings. In the following description, like reference numerals would rather designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless there is a particular description contrary thereto. The terms such as "unit," "module," and the like refer to units for processing at least one function or operation, which may be implemented by hardware, software, or a combination thereof.

FIG. 1 is a schematic block diagram of a wavelength tuning system according to a first embodiment of the present disclosure.

As shown in FIG. 1, the wavelength tuning system 10 according to the first embodiment of the present disclosure includes all or some of central office unit 100, central office terminal (COT) equipment 110, one or more first optical modules 120, a first optical multiplexer/demultiplexer (MUX/DEMUX) 130, a second optical MUX/DEMUX 140, one or more second optical modules 150, and one or more remote office units 160. Not all blocks as shown in FIG. 1 are requisite components, and in other embodiments, some blocks included in the wavelength tuning system may be added, changed, or deleted.

The central office unit 100 and remote office unit 160 are receiver/transmitter units that transmit and receive communication information in an optical communication system. This embodiment describes a case where the central office unit 100 is baseband unit (BBU) and the remote office unit 160 is remote radio header (RRH), but this is for convenience of explanation. The central office unit 100 and the remote office unit 160 may be implemented in various forms such as a switch, a router, or the like.

The central office unit 100 refers to a device that is installed in a toll center or a central office. The central office unit 100 receives communication information from an exchange office. The central office unit 100 has input/output ports each equipped with an optical module that generates an optical signal, thereby generating an optical signal containing the received communication information. The generated optical signal is transmitted to the COT equipment 110 through an optical path connected to each input/output port.

Meanwhile, in the uplink direction, the central office unit 100 receives at least one optical signal transmitted from the COT equipment 110 through at least one optical path. At this time, at least one optical signal transmitted to the central office unit 100 includes communication information transmitted from user equipment or a terminal.

The COT equipment 110 receives the optical signal outputted from each optical path connected to the central office unit 100 and converts a plurality of received optical signals into electrical signals, respectively. Thereafter, the COT equipment 110 re-convert the respective electrical signals to optical signals of different wavelengths and then transmit the re-converted optical signals to the optical paths. The COT equipment 110 includes all or some of a channel unit 112 and a wavelength tuning apparatus 118.

The channel unit 112 includes all or some of one or more front-end ports 114 and one or more rear-end ports 116. The front-end ports 114 are respectively equipped with optical modules to receive one or more output optical signals from optical paths connected to the central office unit 100, and they convert the optical signals received to electrical signals, respectively.

The rear-end ports 116 receive electrical signals. The rear-end ports 116 are respectively equipped with first optical modules 120 capable of generating optical signals having different wavelengths, respectively. The first optical modules 120 re-convert the electrical signals received into optical signals having different wavelengths. Thereafter, the rear-end ports 116 transmit the re-converted optical signals having different wavelengths to the first optical MUX/DEMUX 130 through different optical paths. In this case, the first optical modules 120 incorporate a function for enabling to output optical signals having equal wavelengths to the wavelength of respective ports of the first optical MUX/DEMUX 130, which are respectively connected with the first optical modules 120, thereby forming an overall optical link. Here, the first optical modules 120 may be self-tuning optical transceivers that incorporate implementations of an automatic wavelength tuning function and a remote wavelength tuning function.

Meanwhile, in the uplink direction, the channel unit 112 receives one or more optical signals having different wavelengths from different optical paths connected to the first optical MUX/DEMUX 130 and converts the optical signals into electrical signals. Thereafter, the channel unit 112 re-converts the respective electrical signals to optical signals and transmits optical signals to the central office unit 100 through the optical paths. At this time, the respective component units included in the channel unit 112 operate to perform the signal processing functions thereof.

Although FIG. 1 shows that the COT equipment 110 includes a single channel unit 112 for illustrative purpose only, it may include multiples of the channel unit 112. For example, the COT equipment 110 may include ten (10) channel units 112, each including four front-end ports 114 and four rear-end ports 116. Accordingly, the COT equipment 110 may be equipped with forty (40) first optical modules 120.

The wavelength tuning apparatus 118 controls the first optical modules 120 for enabling to output optical signals having equal wavelengths to the wavelength of respective ports of the first optical MUX/DEMUX 130, which are respectively connected with the first optical modules 120. Further, the wavelength tuning apparatus 118 controls the second optical modules 150 for enabling to output optical signals having equal wavelengths to the wavelength of respective ports of the second optical MUX/DEMUX 140, which are respectively connected with second optical modules 150. Meanwhile, all information related to the control may be transmitted to the network management equipment of the communication service provider. The wavelength tuning apparatus 118 will be detailed below in FIG. 2.

The first optical MUX/DEMUX 130 combines the optical signals having different wavelengths upon receiving from different optical paths connected to the COT equipment 110 and then transmit the combined optical signals to a single common optical path connected to the second optical MUX/DEMUX 140.

Meanwhile, in the uplink direction, the first optical MUX/DEMUX 130 receives a combined optical signal that includes a plurality of optical signals having different wavelengths from the single common optical path connected to the second optical MUX/DEMUX 140, and it divides the received combined optical signal into different optical paths according to wavelengths and then transmits the divided optical signals in the different optical paths to the COT equipment 110.

The second optical MUX/DEMUX 140 receives a combined optical signal including a plurality of optical signals having different wavelengths from the single common optical path connected to the first optical MUX/DEMUX 130, and it divides the received superposed optical signal into different optical paths according to wavelengths and then transmits the divided optical signals in the different optical paths to the one or more remote office units 160.

Meanwhile, the second optical MUX/DEMUX 140 combines the optical signals having different wavelengths upon receiving from different optical paths connected to the one or more remote office units 160 and then transmits the combined optical signals to the single common optical path connected to the first optical MUX/DEMUX 130.

The one or more remote office units 160 utilize different optical paths connected thereto for receiving optical signals including communication information corresponding to the respective remote office units 160. Thereafter, the remote office units 160 transmit the received communication information to the relevant terminals. The second optical modules 150 installed in the remote office units 160 incorporate a function for enabling to output optical signals having the equal wavelengths to the wavelength of respective ports of the second optical MUX/DEMUX 140, which are respectively connected with the second optical modules 150, thereby forming an overall optical link. Here, the second optical modules 150 may be self-tuning optical transceivers that incorporate implementations of an automatic wavelength tuning function and a remote wavelength tuning function.

Figure 2:
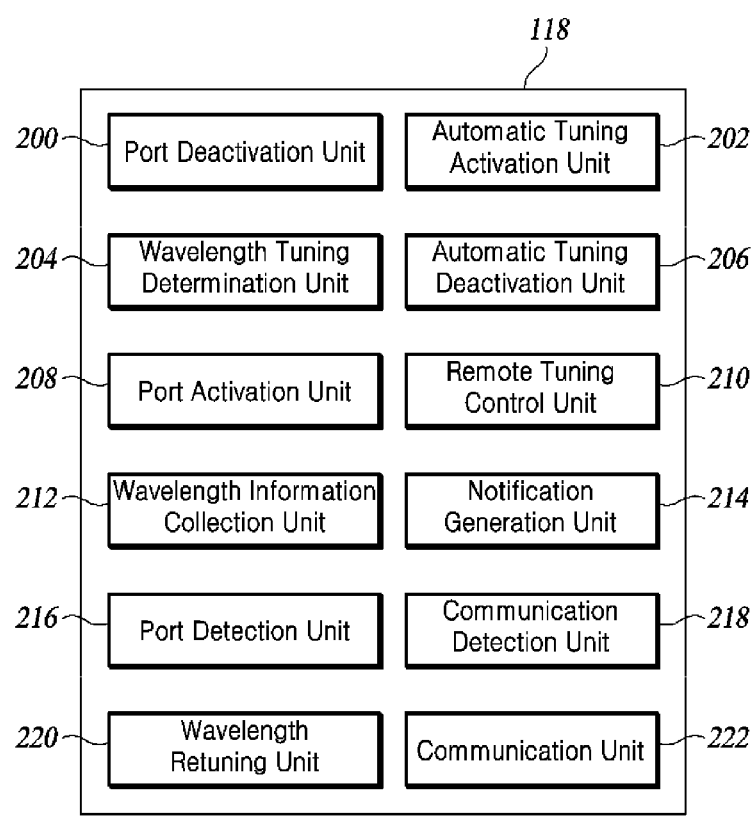
FIG. 2 is a detailed block diagram of a wavelength tuning apparatus according to at least one embodiment of the present disclosure.

FIG. 2 is a detailed block diagram of the wavelength tuning apparatus 118 according to at least one embodiment of the present disclosure.

As shown in FIG. 2, the wavelength tuning apparatus 118 according to the first embodiment of the present disclosure includes all or some of a port deactivation unit 200, an automatic tuning activation unit 202, a wavelength tuning determination unit 204, an automatic tuning deactivation unit 206, a port activation unit 208, a remote tuning control unit 210, a wavelength information collection unit 212, a notification generation unit 214, a port detection unit 216, a communication detection unit 218, a wavelength retuning unit 220, and a communication unit 222. Not all blocks shown in FIG. 2 are requisite components, and in other embodiments, some blocks included in the wavelength tuning apparatus 118 may be added, changed, or deleted.

The port deactivation unit 200 blocks signal input/output of the front-end port 114 corresponding to the rear-end port 116 installed with the first optical module 120 subject to wavelength tuning. In other words, blocking a signal transmitted from the central office unit 100 can in turn block external interference from the central office unit 100 during a wavelength scan. To block signal input/output of the front-end port 114, the photoelectric conversion function of the optical module installed on the front-end port 114 is deactivated, but not necessarily so. For example, the signal input/output blocking operation may be performed according to activation and deactivation of a buffer drive inside the front-end port 114.

The automatic tuning activation unit 202 activates the automatic tuning function implemented inside the first optical module 120 subject to wavelength tuning. For example, the automatic tuning activation unit 202 may activate the automatic tuning function by sending an automatic tuning function activation command to the first optical module 120 through the rear-end port 116. When the automatic tuning function of the first optical module 120 is activated, the first optical module 120 and the second optical module 150 perform a wavelength scan. In particular, the first optical module 120 retunes its wavelength within a preset wavelength range until it outputs an optical signal having the equal wavelength to the wavelength of the port of the first optical MUX/DEMUX 130 connected to the first optical module 120. The second optical module 150 retunes its wavelength within the preset wavelength range until it outputs an optical signal having the equal wavelength to the wavelength of the port of the second optical MUX/DEMUX 140 connected to the second optical module 150. The preset wavelength range is determined by the standard wavelength of a multi-wavelength channel recommended by the International Telecommunication Union-Telecommunication standardization sector (ITU-T) such as ITU-T G.692 or ITU-T G.694.1. The operation method of the automatic tuning function is not limited to the above-described example.

The wavelength tuning determination unit 204 determines whether the wavelength of the optical signal outputted by the first optical module 120 is tuned according to the wavelength scan. For example, the wavelength tuning determination unit 204 obtains a wavelength tuning completion signal from the first optical module 120 to determine whether the wavelength of the optical signal outputted by the first optical module is tuned. The method for determining whether the wavelength is tuned is not limited to the above-described example.

The automatic tuning deactivation unit 206 deactivates the automatic tuning function implemented inside the first optical module 120. For example, the automatic tuning deactivation unit 206 deactivates the automatic tuning function by sending an automatic tuning deactivation command to the first optical module 120 through the rear-end port 116.

The port activation unit 208 releases signal input/output blocking of the front-end port 114 corresponding to the rear-end port 116 installed with the first optical module 120 subject to wavelength tuning. In other words, when the wavelength is tuned as a result of performing the wavelength scan, the signal input/output blocking of the front-end port 114 is released so that the signal transmitted from the central office unit 100 can be inputted again. The port activation unit 208 activates the photoelectric conversion function of the optical module installed on the front-end port 114 to release the signal input/output blocking of the front-end port 114, but not necessarily so. For example, an operation of transmitting and receiving an input/output signal may be performed according to activation and deactivation of the buffer drive inside the front-end port 114.

The remote tuning control unit 210 controls the remote tuning function implemented inside the first optical module 120 subject to wavelength tuning. For example, the remote tuning control unit 210 activates the remote tuning function by sending a remote tuning function activation command to the first optical module 120 through the rear-end port 116. When the remote tuning function of the first optical module 120 is activated, an automatic correction operation is performed on the wavelength of the optical signal outputted by the second optical module 150 based on the tuned-wavelength of the optical signal outputted by the first optical module 120. This process can correct an error that the wavelength of the optical signal outputted by the second optical module 150 does not match the wavelength of the port of the second optical MUX/DEMUX 140 even after performing the automatic tuning function.

The wavelength information collection unit 212 obtains information on the tuned wavelength from the first optical module 120 and stores the obtained wavelength information. The wavelength information collection unit 212 may use a digital diagnostics monitoring interface (DDMI) to obtain the information on the tuned wavelength from the first optical module 120. The method for obtaining the wavelength information is not limited to the above-described example.

The notification generation unit 214 generates a notification when the wavelength of the optical signal outputted by the first optical module is not tuned within a preset time. The notification generation unit 50 may generate a notification by transmitting the generated notification to the network management equipment of a communication service provider. Responsive to the occurrence of the notification, a network administrator can check the connection status or the wavelength allocation state of the optical MUX/DEMUX or cause the wavelength tuning apparatus 118 to start over the wavelength tuning process. Although FIG. 2 illustrates the notification generation unit 214 as a separate component, it may also be implemented by the wavelength tuning determination unit 204.

The port detection unit 216 detects that the first optical module is installed on the rear-end port 116. The port detector 216 detects whether the first optical module 120 installed on the rear-end port 116 is a self-tuning optical module in which an automatic wavelength tuning function and a remote wavelength tuning function are implemented. Upon detecting that the first optical module 120 installed on the rear-end port 116 is a self-tuning optical module, the port detector 216 may control the wavelength tuning apparatus 118 to perform a wavelength tuning process.

In addition, the port detection unit 216 causes the wavelength of the first optical module 120 to be tuned to the wavelength pre-stored in the wavelength information collection unit 212 upon determining that the first optical module 120 is installed on the rear-end port 116 with the wavelength information corresponding to the same rear-end port 116 stored in the wavelength information collection unit 212. Therefore, when the first optical module 120 is re-installed or replaced after the wavelength tuning for the first optical module 120 is completed, the wavelength tuning process is not performed over again, but the pre-stored wavelength information is used to immediately tune the wavelength of the optical signal outputted by the first optical module 120. At this time, automatic correction can be made on the wavelength of the optical signal outputted by the second optical module 150 based on the tuned-wavelength of the optical signal outputted by the first optical module 120 by activating the remote tuning function of the first optical module 120.

The communication detection unit 218 detects a communication failure and its settlement between the first optical module 120 and the second optical module 150. For example, the communication detection unit 218 may obtain a Loss of Signal (LOS) alarm from the first optical module 120 to detect a communication failure, and it may be responsive to detect when the LOS alarm is terminated for detecting the communication failure is resolved. The communication detection unit 21 causes the wavelength of the optical signal outputted from the first optical module 120 to be tuned to the wavelength information pre-stored in the wavelength information collection unit 212 upon determining that an occurrence of the communication failure unresolved within a preset time. For example, when a power failure occurs in the remote office unit 160 leaving the same powerless, communication failure occurs between the first optical module 120 and the second optical module 150. Subsequent restoration of the power to the remote office equipment may still be incapable of resolving the communication failure since the wavelength tuning has been initialized. At this time, the communication detection unit 218 does not perform the wavelength tuning process for the first optical module 120 over again but uses the pre-stored wavelength information to immediately tune the wavelength of the optical signal outputted by the first optical module 120 and to automatically correct the wavelength of the optical signal outputted by the second optical module 150, through the remote tuning function of the first optical module 120 and based on the tuned-wavelength of the optical signal outputted by the first optical module 120. Meanwhile, when a power failure occurs in the central office unit 100 leaving the central office unit 100 and the COT equipment 110 powerless until the power is restored, the wavelength tuning apparatus 118 performs the wavelength tuning process over again.

The communication detection unit 218, when failed to perform the wavelength tuning of the first optical module 120 and the second optical module 150 by using the pre-stored wavelength information, controls the port deactivation unit 200, automatic tuning activation unit 202, wavelength tuning determination unit 204, automatic tuning deactivation unit 206, and the port activation unit 208 to perform the wavelength tuning process over again. For example, when a communication failure occurs by changing a port of the first optical MUX/DEMUX 130, to which the first optical module 120 is connected, the pre-stored wavelength is different from that of the changed port, disabling to cause the wavelength of the optical signal outputted by the first optical module 120 to be tuned to the pre-stored wavelength. At this time, the communication detector 218 may perform the wavelength tuning process over again, so that the first optical module 120 can be tuned to output an optical signal having the equal wavelength to the wavelength characteristic of the changed port.

The communication unit 222 operates for transmitting and receiving various data and signals in cooperation with the network management equipment of the communication service provider. The communication service provider may utilize, but not limited to, an element management system (EMS), log management system (LMS), and software-defined network (SDN) for the network management equipment. Alternatively, through this cooperation, the network management equipment of the communication service provider may receive all information on the control performed by the wavelength tuning apparatus 118. Furthermore, the network management equipment of the communication service provider may cause the wavelength tuning process to be performed over again or delete pre-stored wavelength information and deactivate the function of the wavelength tuning apparatus 118. In addition, the network management equipment of the communication service provider may utilize the communication unit 222 as a route to query the information on the first optical module 120 and the second optical module 150. At this time, the information of the optical modules may include digital diagnostic monitoring (DDM) information such as information on tuned wavelength, power transmission/reception, and serial information.

Figure 3:
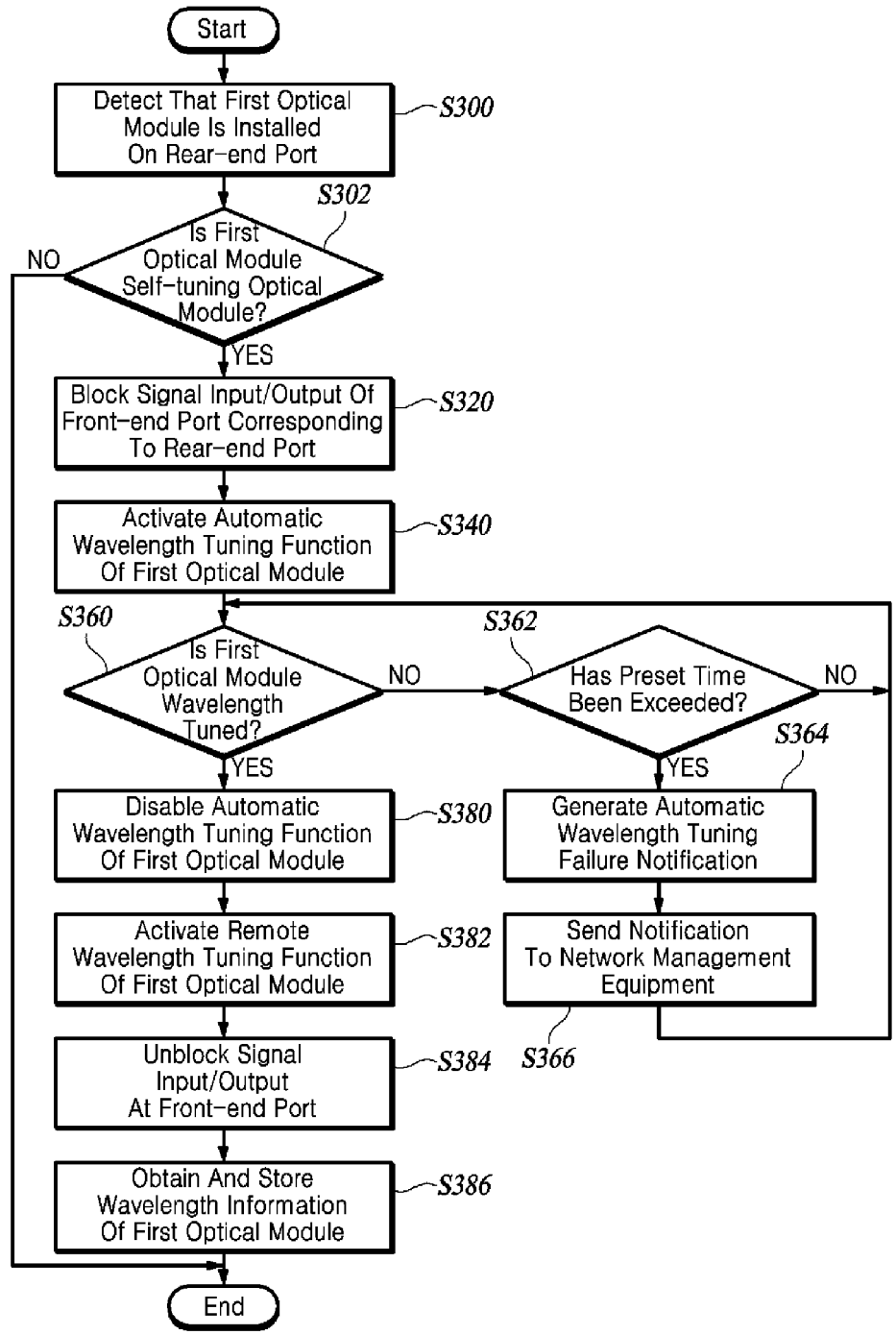
FIG. 3 is a flowchart of a wavelength tuning method according to at least one embodiment of the present disclosure.

FIG. 3 is a flowchart of a wavelength tuning method according to at least one embodiment of the present disclosure.

The wavelength tuning apparatus 118 detects that the first optical module 120 is installed on the rear-end port 116 (in Step S300). The wavelength tuning apparatus 118 checks whether the installed first optical module 120 is a self-tuning optical module in which an automatic wavelength tuning function and a remote wavelength tuning function are implemented (S302). When the installed first optical module is not a self-tuning optical module, the wavelength tuning process is ended. When the installed first optical module is not a self-tuning optical module, the wavelength tuning apparatus 118 may generate a notification through the network management equipment of the communication service provider to guide a network administrator to personally tune the wavelength or replace the optical module.

The wavelength tuning apparatus 118 blocks the signal input/output of the front-end port 114 corresponding to the rear-end port 116 on which the first optical module is installed upon determining that the installed first optical module is a self-tuning optical module (S320). In other words, the wavelength tuning apparatus 118 blocks a signal transmitted from the central office unit 100, thereby blocking external interference from the central office unit 100 during a wavelength scan. Here, the photoelectric conversion function of the optical module installed on the front-end port 114 may be controlled to block signal input/output of the front-end port 114 but is not necessarily so. For example, the signal transmission/reception and blocking operation may be performed according to activation and deactivation of the buffer drive inside the front-end port 114.

The wavelength tuning apparatus 118 activates the automatic tuning function implemented inside the first optical module 120 (S340). Accordingly, the first optical module 120 and the second optical module 150 may perform a wavelength scan. In particular, the first optical module 120 retunes its wavelength within a preset wavelength range until it outputs an optical signal having the equal wavelength to the wavelength of the port of the first optical MUX/DEMUX 130 connected to the first optical module 120. The second optical module 150 retunes its wavelength within the preset wavelength range until it outputs an optical signal having the equal wavelength to the wavelength of the port of the second optical MUX/DEMUX 140 connected to the second optical module 150. The preset wavelength range is determined by the standard wavelength of a multi-wavelength channel recommended by the ITU-T such as ITU-T G.692 or ITU-T G.694.1. The operation method of the automatic tuning function is not limited to the above-described example.

The wavelength tuning apparatus 118 determines whether tuning has been made on the wavelength of the optical signal outputted by the first optical module 120 as a result of performing the wavelength scan by the first optical module 120 and the second optical module 150 (S360). To determine whether the tuning has been made on the wavelength of the optical signal outputted by the first optical module 120, the wavelength tuning apparatus 118 may obtain a wavelength tuning completion signal from the first optical module 120. The method for determining whether the wavelength is tuned is not limited to the above-described example.

When it is determined that no tuning has been made on the wavelength of the optical signal outputted by the first optical module 120, the wavelength tuning apparatus 118 checks whether the wavelength scanning time exceeds a preset time (S362). Within the preset time, the wavelength tuning apparatus 118 continues to check whether tuning has been made on the wavelength of the optical signal outputted by the first optical module 120 (S360). When the preset time is exceeded, the wavelength tuning apparatus 118 generates an automatic wavelength tuning failure notification (S364). The wavelength tuning apparatus 118 transmits the automatic wavelength tuning failure notification to the network management equipment of the communication service provider (S366) and continuously checks whether tuning has been made on the wavelength of the optical signal outputted by the first optical module 120 (S360). Accordingly, the wavelength tuning apparatus 118 may provide a guide to check the connection status or the wavelength allocation status of the optical MUX/DEMUX or render the network administrator to terminate the wavelength tuning process by using the network management equipment. On the other hand, once the automatic wavelength tuning failure notification is generated, no new automatic wavelength tuning failure notification is generated even if no tuning has been made on the wavelength of the optical signal outputted from the first optical module 120.

When it is determined that tuning has been made on the wavelength of the optical signal outputted by the first optical module 120, the wavelength tuning apparatus 118 deactivates the automatic tuning function implemented inside the first optical module 120 and activates the remote tuning function implemented inside the first optical module 120 (S380 and S384). Thereby, the wavelength of the optical signal outputted by the second optical module 150 is automatically corrected based on the tuned-wavelength of the optical signal outputted by the first optical module 120

The wavelength tuning apparatus 118 releases the signal input/output blocking at the front-end port 114 (S384). Accordingly, the input of the signal transmitted from the central office unit 100 may be regained.

The wavelength tuning apparatus 118 obtains information on the tuned wavelength from the first optical module 120 and stores the obtained wavelength information (S386). The wavelength tuning apparatus 118 may use DDMI (Digital Diagnostics Monitoring Interface) to obtain the information on the tuned wavelength from the first optical module 120, but the method for obtaining wavelength information is not limited to the above-described example.

Figure 4:
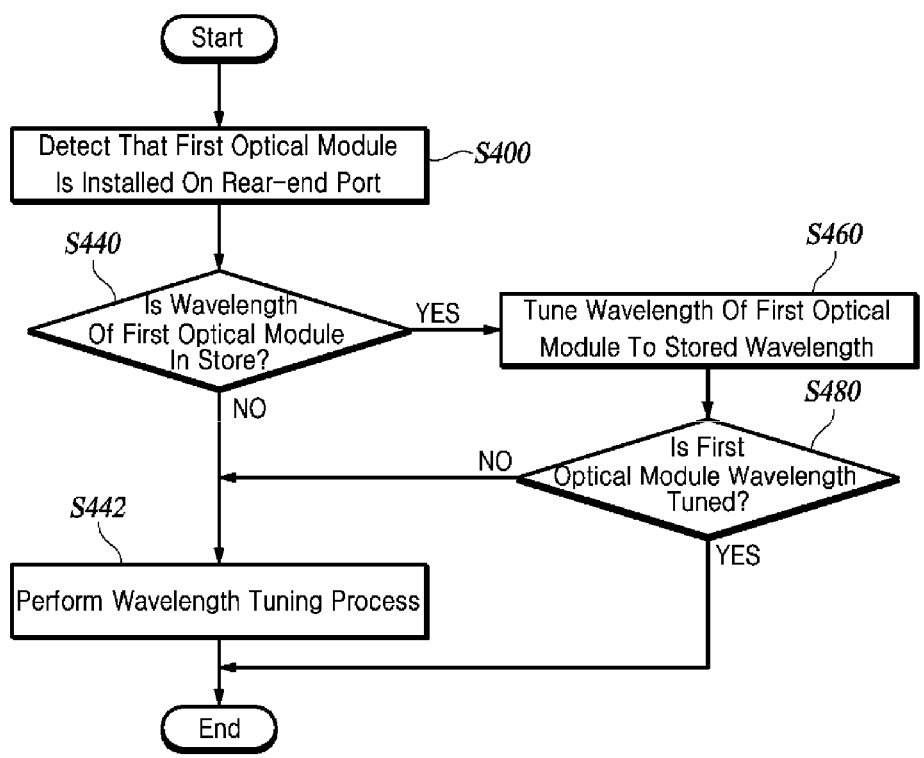
FIG. 4 is a flowchart of a wavelength tuning method when re-installing and replacing an optical module according to at least one embodiment of the present disclosure.

FIG. 4 is a flowchart of a wavelength tuning method when re-installing and replacing an optical module according to at least one embodiment of the present disclosure.

The wavelength tuning apparatus 118 detects whether the first optical module 120 is installed on the rear-end port 116 (S400). The wavelength tuning apparatus 118 checks whether it stores the wavelength information corresponding to the corresponding rear-end port 116 (S440).

When there is wavelength information stored in the wavelength tuning apparatus 118, it causes the wavelength of the optical signal outputted by the first optical module 120 to be tuned to the stored wavelength (S460). At this time, the wave length of the optical signal outputted by the second optical module 150 can be automatically corrected based on the tuned-wavelength of the optical signal outputted by the first optical module 120 by activating the remote tuning function of the first optical module 120.

The wavelength tuning apparatus 118 determines whether the wavelength of the optical signal outputted by the first optical module 120 is successfully tuned to the stored wavelength information (S480). To determine whether the tuning has been made on the wavelength of the optical signal outputted by the first optical module 120, the wavelength tuning apparatus 118 may obtain a wavelength tuning completion signal from the first optical module 120. The method for determining whether the wavelength is tuned is not limited to the above-described example.

When there is no wavelength information stored in the wavelength tuning apparatus 118, or when tuning is failed on the wavelengths of the first optical module 120 and the second optical module 150 by using pre-stored wavelength information, the wavelength tuning apparatus 118 performs the wavelength tuning process (S320 to S386) of FIG. 3 (S442).

Figure 5:
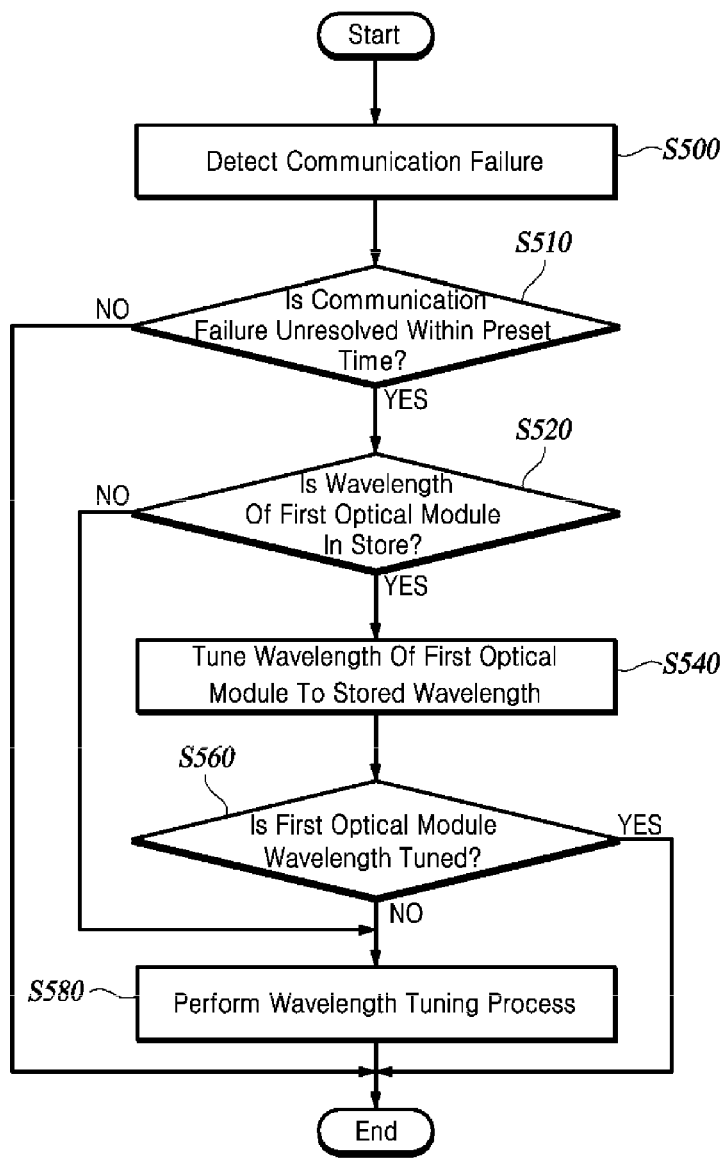
FIG. 5 is a flowchart of a wavelength tuning method according to at least one embodiment of the present disclosure when a communication failure occurs.

FIG. 5 is a flowchart of a wavelength tuning method according to at least one embodiment of the present disclosure when a communication failure occurs.

The wavelength tuning apparatus 118 detects whether there is a communication failure between the first optical module 120 and the second optical module 150 (S500). A communication failure may be detected by obtaining a Loss of Signal (LOS) alarm from the first optical module 120 among other methods of detecting communication failure.

After detecting the communication failure, the wavelength tuning apparatus 118 checks whether the communication failure is resolved within a predetermined time (S510). Termination of the LOS alarm signal from the first optical module 120 allows one to detect that the communication failure has been resolved, although the present disclosure may use other methods of detecting the resolution of the communication failure.

When the communication failure has not been resolved even after a predetermined time has elapsed since the occurrence thereof, the wavelength tuning apparatus 118 checks whether it stores the wavelength information for the first optical module 120 (S520). If it stores no wavelength information, the wavelength tuning apparatus 118 performs the wavelength tuning process (S320 to S386) of FIG. 3 (S580).

When there is wavelength information stored in the wavelength tuning apparatus 118, the controller 118 causes the wavelength of the optical signal outputted by the first optical module 120 to be tuned to the stored wavelength (S540).

For example, when a power failure occurs in the remote office unit 160 leaving the same powerless, communication failure occurs between the first optical module 120 and the second optical module 150. Subsequent restoration of the power to the remote office equipment may still be incapable of resolving the communication failure since the wavelength tuning has been initialized. At this time, the wavelength tuning apparatus 118 does not perform the wavelength tuning process for the first optical module 120 over again but uses the pre-stored wavelength information to immediately tune the wavelength of the optical signal outputted by the first optical module 120 and to automatically correct the wavelength of the optical signal outputted by the second optical module 150 based on the tuned-wavelength of the optical signal outputted by the first optical module 120, by activating the remote tuning function of the first optical module 120 and. Meanwhile, when a power failure occurs in the central office unit 100 leaving the central office unit 100 and the COT equipment 110 powerless until the power is restored, the wavelength tuning apparatus 118 performs the wavelength tuning process (S320 to S386) of FIG. 3.

The wavelength tuning apparatus 118 determines whether the wavelength of the optical signal outputted by the first optical module 120 is successfully tuned to the stored wavelength information (S560). To determine whether the tuning has been made on the wavelength of the optical signal outputted by the first optical module 120, the wavelength tuning apparatus 118 may obtain a wavelength tuning completion signal from the first optical module 120. The method for determining whether the wavelength is tuned is not limited to the above-described example.

When the wavelength tuning of the first optical module 120 and the second optical module 150 by using the pre-stored wavelength information fails, the wavelength tuning apparatus 118 performs the wavelength tuning process (S320 to S386) of FIG. 3 (S580). For example, when a communication failure occurs by changing a port of the first optical MUX/DEMUX 130, to which the first optical module 120 is connected, the pre-stored wavelength is different from that of the changed port, disabling to cause the wavelength of the optical signal outputted by the first optical module 120 to be tuned to the pre-stored wavelength. At this time, the wavelength tuning apparatus 118 may perform the wavelength tuning process over again, so that the first optical module 120 is tuned to output an optical signal having the equal wavelength to the wavelength characteristic of the changed port.

Although the steps in FIGS. 3 to 5 are described to be sequentially performed, they merely instantiate the technical idea of some embodiments of the present disclosure. In other words, various modifications, additions, and substitutions are possible by changing the sequences described in the respective drawings or by performing two or more of the steps in parallel, and hence the steps in FIGS. 3 to 5 are not limited to the illustrated chronological sequences.

The operation of the wavelength tuning apparatus 118 of at least one embodiment of the present disclosure as illustrated in FIG. 2 can be implemented as a computer program and recorded on a computer-readable recording medium. The computer-readable recording medium that records a program for implementing the operation of the wavelength tuning apparatus 118 of at least one embodiment of the present disclosure includes any type of recording device on which data that can be read by a computer system are recordable. Examples of the computer-readable recording medium further include non-transitory medium such as a ROM, a RAM, a CD-ROM, a magnetic tape, a floppy disk, and an optical data storage and transitory medium such as data transmission medium. Further, the computer-readable recording medium can be distributed in computer systems connected via a network, wherein computer-readable codes can be stored and executed in a distributed mode.

As described above, according to some embodiments, when automatically tuning the wavelength of an optical signal by using an auto-tuning optical module, the present disclosure can block an external interference from central office equipment and perform a double-action operation of tuning the wavelength of the optical module installed in a remote office unit to increase the success rate of the wavelength tuning.

In addition, some embodiments, the present disclosure can facilitate inventory management of optical modules and enable installing or replacing the optical modules without involving a field technician with special knowledge, thereby reducing network management personnel and costs.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of at least one embodiment of the present disclosures is not limited by the illustrations. Accordingly, one of ordinary skill would understand the scope of the claimed invention is not to be limited by the above explicitly described embodiments but by the claims and equivalents thereof.

What is claimed is:

1. A method of tuning a wavelength of an optical signal outputted by a first optical module installed on central office terminal (COT) equipment on a central office side and a wavelength of an optical signal outputted by a second optical module installed on a remote office side in an optical communication system, the method comprising:
    performing a port deactivation process for blocking a signal input/output at a front-end port corresponding to a rear-end port on which the first optical module is installed;
    performing a first control process for controlling the first optical module and the second optical module to perform a wavelength scan by activating an automatic wavelength tuning function of the first optical module;
    determining whether tuning is made on the wavelength of the optical signal outputted by the first optical module as a result of performing the wavelength scan;
    performing a second control process for deactivating the automatic wavelength tuning function of the first optical module upon determining that the tuning is made on the wavelength of the optical signal outputted by the first optical module; and
    performing a port activation process for releasing the blocking of the signal input/output at the front-end port.

2. The method of claim 1, further comprising:
    upon determining that the tuning is made on the wavelength of the optical signal outputted by the first optical module, activating a remote wavelength tuning function of the first optical module, and thereby performing an automatic correction operation on the wavelength of the optical signal outputted by the second optical module based on a tuned-wavelength of the first optical module.

3. The method of claim 1, further comprising:
    upon determining that the tuning is made on the wavelength of the optical signal outputted by the first optical module, obtaining tuned-wavelength information from the first optical module and storing the tuned-wavelength information.

4. The method of claim 3, further comprising, after the storing of the tuned-wavelength information:
    detecting whether the first optical module is re-installed or replaced at the rear-end port; and
    upon detecting that the first optical module is re-installed or replaced, tuning the wavelength of the optical signal outputted by the first optical module by using the tuned-wavelength information having been stored.

5. The method of claim 3, further comprising, after the storing of the tuned-wavelength information:
    detecting a communication failure between the first optical module and the second optical module; and
    upon detecting the communication failure, tuning the wavelength of the optical signal outputted by the first optical module by using the tuned-wavelength information having been stored.

6. The method of claim 1, further comprising:
after determining that the tuning is made on the wavelength of the optical signal outputted by the first optical module,
detecting a communication failure between the first optical module and the second optical module, and
upon determining that the communication failure is not resolved within a preset time, repeating a round of the performing of the port deactivation process, the performing of the first control process, the determining of whether the tuning is made on the wavelength, the performing of the second control process, and the performing of the port activation process and thereby retuning wavelengths of optical signals outputted by the first optical module and the second optical module.

7. The method of claim 1, wherein the determining of whether the tuning is made on the wavelength comprises:
generating an automatic wavelength tuning failure notification when the tuning is not made on the wavelength of the first optical module within a preset time.

8. A wavelength tuning apparatus for tuning a wavelength of an optical signal outputted by a first optical module installed on central office terminal (COT) equipment on a central office side and a wavelength of an optical signal outputted by a second optical module installed on a remote office side in an optical communication system, comprising:
a port deactivation unit configured to block a signal input/output at a front-end port corresponding to a rear-end port on which the first optical module is installed;
an automatic tuning activation unit configured to control the first optical module and the second optical module to perform a wavelength scan by activating an automatic wavelength tuning function of the first optical module;
a wavelength tuning determination unit configured to determine whether tuning is made on the wavelength of the optical signal outputted by the first optical module as a result of performing the wavelength scan;
an automatic tuning deactivation unit configured to deactivate the automatic wavelength tuning function of the first optical module upon determining that the tuning is made on the wavelength of the optical signal outputted by the first optical module; and
a port activation unit configured to release blocking of the signal input/output at the front-end port.

9. The wavelength tuning apparatus of claim 8, further comprising:
a remote tuning control unit configured to activate a remote wavelength tuning function of the first optical module upon determining that the tuning is made on the wavelength of the optical signal outputted by the first optical module, and thereby to perform an automatic correction operation on the wavelength of the optical signal outputted by the second optical module based on a tuned-wavelength of the first optical module.

10. The wavelength tuning apparatus of claim 8, further comprising:
a wavelength information collection unit configured to obtain tuned-wavelength information from the first optical module upon determining that the tuning is made on the wavelength of the optical signal outputted by the first optical module and to store the tuned-wavelength information.

11. The wavelength tuning apparatus of claim 10, further comprising:
a port detection unit configured to detect whether the first optical module is re-installed or replaced at the rear-end port after storing the tuned-wavelength information, and upon detecting that the first optical module is re-installed or replaced, to tune the wavelength of the optical signal outputted by the first optical module by using the tuned-wavelength information having been stored.

12. The wavelength tuning apparatus of claim 10, further comprising:
a communication detection unit configured to detect a communication failure between the first optical module and the second optical module after storing the tuned-wavelength information, and upon detecting the communication failure, to tune the wavelength of the optical signal outputted by the first optical module by using the tuned-wavelength information having been stored.

13. The wavelength tuning apparatus of claim 8, further comprising:
a wavelength retuning unit configured to detect a communication failure between the first optical module and the second optical module after determining that the tuning is made on the wavelength of the optical signal outputted by the first optical module, and upon determining that the communication failure is not resolved within a preset time, to control to retune wavelengths of the first optical module and the second optical module.

14. The wavelength tuning apparatus of claim 8, wherein the wavelength tuning determination unit further comprises:
a notification generation unit configured to generate an automatic wavelength tuning failure notification when the tuning is not made on the wavelength of the first optical module within a preset time.

* * * * *